3,031,307
PUREE AND METHOD OF MAKING SAME
Samuel M. Blakemore, P.O. Box 168, Cincinnati, Ohio
No Drawing. Filed Jan. 15, 1959, Ser. No. 786,919
7 Claims. (Cl. 99—100)

This invention relates to the preparation of fruit and vegetable purees.

An object of this invention is to provide a method of preparing a puree in which flavor values in the skins of fruit are retained in the finished puree.

Fruits with tough skins, such as cherries and grapes, can not be economically made into purees simply by sieving, because the tough portions will not pass through the sieves, and only the soft pulpy portions go through a sieve. Fruits such as these ordinarily must be cooked until the tough portions are sufficiently softened to go through the sieve. Cooking results in a cooked taste and a substantial loss of desirable flavor. An object of this invention is to provide a method of preparing a puree from tough skinned fruit in which the skin elements are made a part thereof.

Citrus fruits are particularly difficult to make into purees because, in order to soften the citrus peel so that it can be sieved, it is necessary to boil it for extended periods of time, for example, an hour or more. This long boiling results in a major loss of the peel oil, which is volatile with steam. The peel oil is a main source of the characteristic flavors of the citrus fruits. Any major loss of peel oil results in purees which are inferior as flavorings. A further object of this invention is to provide a method of preparing a puree of citrus fruits in which peel flavor values are retained.

A further object of this invention is to provide a method of forming a whole fruit puree without cooking or heating to temperatures at which substantial amounts of peel oil are lost so that the finished puree contains substantially all the peel oil and other flavor values of the peel.

In the past, attempts have been made to form purees of such fruits by grinding up the fruit. However, such grinding operations have not yielded satisfactory purees, because of crushing of pits or seeds, so that the crushed pits or seeds can not be removed satisfactorily. A further object of this invention is to provide a method of reducing fruits or vegetables to a puree without crushing the seeds or pits.

A further object of this invention is to reduce a fruit to a puree sufficiently thin to pass through a screen sufficiently fine to retain seeds or pits without grinding sufficiently to crush such seeds or pits.

A further object of this invention is to provide a fruit puree without mechanical grinding sufficient to break up pits or seeds and without the necessity for separation of seeds and pits by hand.

In my process, an enzyme is employed to destroy the pectin which binds the fruit cells together. When the pectin is destroyed the fruit disintegrates into fruit fibres floating in the juice. The enzyme used is pectinase (also known as polygalacturonase). The pectinase splits the binder, pectin, into units which have no binding properties, and a result, the fruit loses its normal structure, yielding fruit fibres floating in juice.

The fruit is first sorted to eliminate unsound fruit. Then, the fruit is washed and ground through a grinder, such as an ordinary meat grinder, using a plate with holes sufficiently large to pass any seeds or pits which may be present. The fruit is then charged into a tank or kettle. If there is a danger of fermentation, the contents of the tank or kettle can be heated to a temperature of 145° F. to effect pasteurization.

The temperature is then adjusted to the optimum temperature range for the action of the pectinase, namely, about 120° F. to 130° F. Sufficient pectinase is mixed with the batch to react with substantially all of the pectin of the fruit in the batch, and the batch is covered and permitted to stand for a sufficient time for the action of the pectinase to continue substantially to completion. The batch is then passed through a fine sieve to remove any pits or seeds and form a seed-free puree. The puree can be standardized for uniform flavor, strength, and fruit content by the addition of sugar, water, or other suitable substances. The finished puree can be prepared for distribution by freezing, heat processing in hermetically sealed cans by the usual canning techniques, or by the addition of suitable chemical preservatives.

The fruit purees are particularly useful for preparing other manufactured food products, as for example, sherbert bases containing a fruit derived from the puree to which additional acid, food color, and stabilizing and emulsifying agents can be added. The method of this invention is particularly useful in preparing purees of citrus fruits, such as oranges, lemons, and limes, and purees of fruits such as cherries or grapes in which removal of all pits is difficult. However, the method can be used in preparing purees of other fruits, such as cranberries, and the like.

The following examples are given to illustrate the invention in greater detail, but it is to be understood that the examples are given primarily by way of example, rather than by way of limitation, except as set forth in the claims.

Example 1

1000 pounds of red, tart, pitted cherries were ground through an ordinary meat chopper, using a plate with holes 0.375 inch in diameter. The coarsely ground cherries were charged into a tank or kettle heated to 145° F. to effect pasteurization, and were then cooled to a temperature of 120° F. to 130° F. 1 pound of a commercial pectinase known as "Pectinol 10M" was thoroughly mixed with the batch in the kettle. Then the kettle was covered and allowed to stand for 16 hours in a room at room temperature without further heating. The contents of the kettle were stirred, yielding a smooth puree. The puree was strained through a screen having 0.032 inch diameter openings to eliminate pits and undesirable specks to form a finished puree.

Example 2

1000 pounds of sound, medium sized California Valencia oranges were ground through a meat chopper having a plate provided with holes 0.375 inch in diameter. The ground fruit was charged into a kettle and heated to a temperature of 167° F. to destroy the enzyme pectin esterase. The batch was cooled to a temperature of 120° F. to 130° F. 1.5 pounds of the commercial pectinase known as "Pectinol 10M" was thoroughly mixed with the batch and the batch was allowed to stand 16 hours in a room at room temperature without additional heating. The batch was stirred to form a smooth puree substantially free of undisintegrated fruit particles. The puree was passed through a sieve having 0.032 inch diameter openings to remove seeds.

To 96 ounces of strained puree were added 13 ounces of sugar, making 109 ounces with which a standard No. 10 can was filled. The contents of the can were used to flavor 300 pounds of commercial sherbet mix which was frozen to give a sherbet having an excellent aroma and body taste.

The size of openings of the plate through which the fruit is ground or chopped, varies with the nature of the fruit being ground. Large, juicy fruits, such as large oranges or grape fruit, can be ground through a plate having 0.250 inch diameter holes. Medium sized oranges, Persian limes, and large lemons can be ground with a plate having 0.375 inch diameter holes. Small fruit having little juice, such as small oranges or kumquats, can be ground through a plate having 0.500 inch openings. The temperature to which the batch is heated before being brought to the temperature preferred for introduction of the pectinase, can vary. When there is no problem of fermentation, or other reason for preliminary heating, the batch, after coarse grinding, can be heated directly to a temperature of 120° F. to 130° F. which is the preferred temperature range of action of pectinase. When there is danger of fermentation, the coarsely ground fruit can be heated to a temperature of 145° F. to effect pasteurization and inhibit possible fermentation. Fruit in which there is likely to be sufficient pectin esterase to cause substantial thickening and jelling and to render the material hard to handle can be heated to a minimum temperature of 167° F. to destroy this enzyme. Fruit which has an unusually tough, hard peel, for example, Persian limes, can be heated to 185° F. Preferably the fruit is not heated above 185° F. because higher temperatures cause excessive loss of peel oil.

The amount of pectinase to be added to the batch after it has been brought to optimum temperature range of 120° F. to 130° F., varies with the physical nature of the fruit and the time of reaction. With red, tart cherries, 1 pound of the commercial pectinase "Pectinol 10M" is sufficient to treat 1000 pounds of fruit when a period of 16 hours is permitted for the reaction to develop. In the case of Valencia oranges, 1.5 pounds thereof have been found sufficient for reaction with 1000 pounds of Valencia oranges. With Persian limes, 3.5 pounds thereof were required for 1000 pounds of fruit.

After reaction of the pectinase has continued for about 16 hours, ordinarily, a simple stirring of the batch results in the formation of a smooth puree. If there are an unduly large number of pieces of non-disintegrated peel present, the temperature can again be raised to the optimum range of 120° F. to 130° F. and more pectinase can be added and more time allowed or more time allowed without the addition of more pectinase. With citrus fruits, it is particularly important that complete disintegration be achieved because the part of the fruit which is most resistant to pectinase, is the flavedo, i.e., the outer part of the peel containing the peel oil.

The finished purees, either straight as made or after standardization by the addition of sugar, water, or the like, can be preserved for distribution by freezing, heating in hermetically sealed cans by the usual canning techniques, or by addition of suitable chemical preservatives or the like.

The fruit purees of this invention can be used as flavorings for ice creams and sherbets, in beverages, candies, confections, and bakery products, in medicinal products, and in various other food products in which flavorings are used.

Having described my invention, what I claim as new and desire to secure by Letters Patent is:

1. A method of forming a whole fruit puree which comprises crushing a seed-containing whole fruit without disintegrating seeds thereof, reacting the crushed fruit with pectinase to reduce the fruit to a substantially pectin-free mixture consisting essentially of fruit fibres, juice, and seeds, and passing the mixture through a sieve having openings sufficiently large to pass the fruit fibres but insufficiently large to pass the seeds to form a seed-free whole fruit puree.

2. A method of forming a citrus fruit puree which comprises crushing a seed-containing citrus fruit through a plate having openings sufficiently large to pass seeds in the citrus fruit, reacting the crushed citrus fruit with pectinase to reduce the fruit to a substantially pectin-free mixture consisting essentially of fruit fibres, juice, and seeds, and passing the mixture through a sieve having openings sufficiently large to pass the fruit fibres but insufficiently large to pass the seeds to form a seed-free citrus fruit puree.

3. A method of forming a cherry puree which comprises crushing seed-containing whole cherries through a plate having openings sufficiently large to pass seeds in the cherries, reacting the crushed cherries with pectinase to reduce the cherries to a substantially pectin-free mixture consisting essentially of fruit fibres, juice, and seeds, and passing the mixture through a sieve having openings sufficiently large to pass the fruit fibres but insufficiently large to pass the seeds to form a seed-free cherry puree.

4. A method of forming a whole fruit puree which comprises crushing seed-containing whole fruit through a plate having openings sufficiently large to pass seeds in the fruit, reacting the fruit with pectinase to reduce the fruit to a substantially pectin-free mixture consisting essentially of fruit fibres, juice, and seeds, and passing the mixture through a sieve having openings sufficiently large to pass the fruit fibres but insufficiently large to pass the seeds to form a seed-free whole fruit puree.

5. A method of forming an orange puree which comprises crushing seed-containing oranges through a plate having openings sufficiently large to pass seeds in the oranges, reacting the crushed oranges with pectinase to reduce the oranges to a substantially pectin-free mixture consisting essentially of fruit fibres, juice, and seeds, and passing the mixture through a sieve having openings sufficiently large to pass the fruit fibres but insufficiently large to pass the seeds to form a seed-free orange puree.

6. A method of forming a lemon puree which comprises crushing seed-containing lemons through a plate having openings sufficiently large to pass seeds in the lemons, reacting the crushed lemons with pectinase to reduce the lemons to a substantially pectin-free mixture consisting essentially of fruit fibres, juice, and seeds, and passing the mixture through a sieve having openings sufficiently large to pass the fruit fibres but insufficiently large to pass the seeds to form a seed-free lemon puree.

7. A method of forming a lime puree which comprises crushing seed-containing limes through a plate having openings sufficiently large to pass seeds in the limes, reacting the crushed limes with pectinase to reduce the limes to a substantially pectin-free mixture consisting essentially of fruit fibres, juice, and seeds, and passing the mixture through a sieve having openings sufficiently large to pass the fruit fibres but insufficiently large to pass the seeds to form a seed-free lime puree.

References Cited in the file of this patent

UNITED STATES PATENTS

| | | |
|---|---|---|
| 2,530,322 | Ash | Nov. 14, 1950 |
| 2,563,855 | McColloch | Aug. 14, 1951 |